(12) United States Patent
Cai et al.

(10) Patent No.: US 10,093,759 B2
(45) Date of Patent: Oct. 9, 2018

(54) PRODUCING HIGH COMONOMER CONTENT PROPYLENE-BASED POLYMERS

(71) Applicant: W. R. Grace & Co.-Conn., Columbia, MD (US)

(72) Inventors: Ping Cai, Lake Jackson, TX (US); Matthew J. Fedec, Lake Jackson, TX (US); Jeffrey D. Goad, Barboursville, WV (US); Jan W. Van Egmond, Charleston, WV (US); Chai-Jing Chou, Sugar Land, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 15/035,985

(22) PCT Filed: Nov. 21, 2014

(86) PCT No.: PCT/US2014/066878
§ 371 (c)(1),
(2) Date: May 11, 2016

(87) PCT Pub. No.: WO2015/077598
PCT Pub. Date: May 28, 2015

(65) Prior Publication Data
US 2016/0289357 A1 Oct. 6, 2016

Related U.S. Application Data

(60) Provisional application No. 61/907,085, filed on Nov. 21, 2013.

(51) Int. Cl.
*C08F 210/06* (2006.01)
(52) U.S. Cl.
CPC ................. *C08F 210/06* (2013.01)

(58) Field of Classification Search
None
See application file for complete search history.

(56) References Cited

U.S. PATENT DOCUMENTS

| 4,543,399 A | 9/1985 | Jenkins, III et al. |
| 4,588,790 A | 5/1986 | Jenkins, III et al. |

(Continued)

FOREIGN PATENT DOCUMENTS

| JP | H0625489 A | 2/1994 |
| WO | 2005066247 A1 | 7/2005 |

(Continued)

OTHER PUBLICATIONS

International Search Report for PCT/US2014/066878 dated Jan. 29, 2015.

(Continued)

*Primary Examiner* — Catherine S Branch
(74) *Attorney, Agent, or Firm* — Lerner, David, Littenberg, Krumholz & Mentlik, LLP

(57) ABSTRACT

A gas-phase process for making a propylene-based polymer in a fluidized-bed reactor, the reactor containing a fluidized bed including polymer product particles and a catalyst, the process having a set of quantitative criteria for maximum monomer partial pressure, maximum reactor temperature, and comonomer content(s) in the propylene-based polymer. The propylene-based polymer may be EBPT or BPRCP. The catalyst may include a catalyst/donor system comprising (1) a supported Ziegler-Natta pro-catalyst, (2) a co-catalyst, and (3) a mixed external electron donor system including (a) an activity limiting agent including at least one carboxylate ester functional group, and (b) a selectivity control agent.

13 Claims, 1 Drawing Sheet

(56) References Cited

U.S. PATENT DOCUMENTS

| | | | |
|---|---|---|---|
| 5,604,172 | A | 2/1997 | Wagner et al. |
| 6,451,936 | B1 | 9/2002 | Sadatoshi et al. |
| 6,455,643 | B1 | 9/2002 | Harlin et al. |
| 7,115,689 | B2 | 10/2006 | Coalter, III et al. |
| 8,178,633 | B2 | 5/2012 | Cai et al. |
| 8,278,403 | B2 | 10/2012 | Coffy et al. |
| 8,324,327 | B2 | 12/2012 | Cai et al. |
| 8,778,826 | B2 | 7/2014 | Gonzalez et al. |
| 2009/0209706 | A1* | 8/2009 | Sheard .................. B01J 8/1809 525/240 |
| 2010/0137505 | A1 | 6/2010 | Cavalieri et al. |
| 2012/0116029 | A1 | 5/2012 | Van Egmond et al. |

FOREIGN PATENT DOCUMENTS

| | | |
|---|---|---|
| WO | 2013083576 A1 | 6/2013 |
| WO | 2014139811 A2 | 9/2014 |

OTHER PUBLICATIONS

Figures 6.1.12-6.1.15 from PhD Dissertation, J. T. Uan-Zo-li, Virginia Polytechnic Inst., Sep. 2005.
"Principles of Gas-Solid Flows," by Fan and Zhu, Cambridge University Press, 1998.
C.Y. Wen, Y.H. Yu, AIChE Journal, vol. 12, p. 610 (1966) as shown in Fluidization: A Unit Operation in Chemical Engineering Downloaded From the Internet, http://www.che.ufl.edu/unit-ops-lab/experiments/FB/FB-manual.pdf (Apr. 15, 2016).
Supplementary European Search Report for Application No. EP14863356, dated Jul. 10, 2017.

\* cited by examiner

PRODUCING HIGH COMONOMER CONTENT PROPYLENE-BASED POLYMERS

CROSS-REFERENCE TO RELATED APPLICATIONS

The present application is a national phase entry under 35 U.S.C. § 371 of International Application No. PCT/US2014/066878 filed Nov. 21, 2014, published in English, which claims priority from U.S. Provisional Application No. 61/907,085 filed Nov. 21, 2013, all of which are hereby incorporated herein by reference.

FIELD OF THE INVENTION

This invention relates to a process for producing high comonomer content propylene-based polymers, and more particularly to a process for producing high comonomer content ethylene-butene-propylene terpolymers (EBPT) and high comonomer content butene-propylene random copolymers (BPRCP).

BACKGROUND OF THE INVENTION

Gas-phase polymerization processes, such as the UNIPOL™ PP process of The Dow Chemical Company, are recognized as one of the most economical methods of manufacturing various polyolefin products, e.g., polyethylene, polypropylene, etc. In the gas-phase process, a high-activity catalyst is usually fed into a fluidized-bed reactor in the form of very small particles, and monomers (and comonomers if present) are converted to a polymer that grows on the catalyst particles. From the production viewpoint, such a polymerization process is desired to run at operating conditions which include (but not limited to):

(A) High monomer partial pressure for increasing catalyst productivity and thus reducing the operational cost of the process. The catalyst productivity is proportional to the partial pressures of the monomer and comonomer(s). For propylene-based polymers, the main monomer is propylene, and the comonomers can be ethylene, butene and other alpha olefins. The comonomer partial pressure is determined by the comonomer/propylene ratio in the reactor, which is related to the desired properties of the polymer.

(B) High reactor temperature for increasing catalyst productivity, reducing external donor usage (this is because the catalyst's xylene-solubles response is better under relatively high temperature), and improving some polymer properties, such as achieving relatively narrower molecular weight distribution. In addition, high reactor temperature increases the overall cooling capacity which can otherwise limit total throughput.

The gas-phase process for making a propylene-based polymer in a fluidized-bed reactor containing a fluidized-bed comprising catalyst particles is well known in the art. One well known commercial process is the UNIPOL® Polypropylene process available for license by W.R. Grace & Co.-Conn. and/or its affiliates. U.S. Pat. No. 4,543,399 discloses that the polymer-forming reaction is exothermic, making it necessary to maintain in some fashion the temperature of the gas stream inside the reactor at a temperature not only below the resin and catalyst degradation temperatures, but also below the fusion or sticking temperature of resin particles produced during the polymerization reaction. This is necessary to prevent plugging of the reactor due to the polymer particle agglomeration and rapid growth of polymer chunks. U.S. Pat. No. 6,460,412 discloses that the operating temperature of the fluidized-bed polymerization reactor is generally ranging from 10° C. to 150° C., preferably 40° C. to 125° C.

In the literature, there are correlations of the polymer melting temperature and crystallization temperature ($T_c$) with the ethylene comonomer content for specific type of polymers (e.g., FIGS. 6.1.12-6.1.15 of Julie Tammy Uan-Zo-li, PhD Dissertation of Virginia Polytechnic Institute and State University, September 2005). However, those correlations are not generally applicable to a wide range of polymers and comonomer contents (such as terpolymer), and more importantly, those correlations are not related to the maximum allowed reactor temperature of terpolymer or butene copolymer operation in a gas-phase fluidized-bed reactor. Moreover, if propylene partial pressure and/or reactor temperature is too high, significant polymer particle agglomeration is observed, thereby resulting in reactor upsets.

High comonomer content ethylene-butene-propylene terpolymers (EBPT) and butene-propylene random copolymers (BPRCP) are attractive polymers because of their unique product properties and end-use applications. For example, the fast line speed of polymer-film making is critical for competitiveness in food packaging. The high-comonomer-content EBPT and BPRCP polymer materials are able to achieve a higher line speed at the same film fabrication condition. Also the polymer materials can be melted within a shorter time duration, thanks to the relatively lower melting temperature.

The production of these high comonomer (i.e., ethylene and butene) content polymers, however, can be difficult in gas-phase reactors. The copolymer content is limited by the polymer particle stickiness which can result in particle agglomeration, and eventually forming polymer "chunks" and "sheets," which often force reactor shutdowns.

When the monomer and/or comonomer partial pressure is increased, each local active site in the catalyst generates more heat, and it is more likely to have the polymer particle stickiness concerns because of the limit in heat transfer. An insufficient heat transfer can result in the heat accumulation and the softening or even melting of the polymer, hence the particle agglomeration. Also, above a certain monomer partial pressure, the morphology of the particles changes to an open "popcorn-like" particle shape. This type of morphology is undesirable and effectively limits the monomer's and comonomers' partial pressures during the operation of manufacturing random copolymers. Regarding the reactor temperature, although a fluidized-bed reactor has excellent temperature uniformity, a bed temperature close to the softening temperature of the product would likely cause polymer stickiness, and hence negatively affect the reactor operability.

Because of these difficulties, high comonomer content EBPT and BPRCP products are rarely produced in gas-phase reactors, especially in stirred gas-phase reactors where the gas velocity is relatively low and the bed material's mixing is relatively less vigorous. Instead, multiple reactors in series, often running under different multi-phase conditions, and often with a pre-polymerization step, are used. For example, one commercial process uses a slurry loop reactor and a gas-phase reactor together to make terpolymers (e.g., U.S. Pat. No. 6,455,643). Such complex multi-reactor setups require relatively high investment and operation cost because of the reactor system.

Even with a fully fluidized polypropylene reactor, product grades with high butene and ethylene contents cannot be made without significantly jeopardizing reactor operation, such as being limited to low monomer partial pressure and/or low operating temperature. These types of reactor conditions result in low catalyst productivity and significantly reduced cooling capacity and thus reduce reactor throughput capacity.

SUMMARY OF THE INVENTION

Accordingly, one example of the present invention is an inventive gas-phase process for making a high comonomer content propylene-based polymer in a fluidized-bed reactor, the reactor containing a fluidized bed comprising polymer product particles and a catalyst, the process having a set of quantitative criteria for maximum monomer partial pressure, maximum reactor temperature and comonomer content(s) in the propylene-based polymer. The propylene-based polymer may be EBPT or BPRCP.

In one embodiment, the inventive process is a gas-phase process for producing a high comonomer content propylene-based polymer, the process comprising the step of contacting, under copolymerization conditions, (A) propylene, butene, and optionally ethylene, with one another within a fluidized-bed reactor, the reactor containing (B) a fluidized bed comprising a catalyst comprising (1) a supported Ziegler-Natta pro-catalyst, (2) a co-catalyst, and (3) a mixed external electron donor system comprising (a) an activity limiting agent and (b) a selectivity control agent, wherein the copolymerization conditions include a reactor temperature in a range, in units of ° C., of (0.57×SIT+4) to (0.87×SIT−9.25) where SIT is the seal initiation temperature of the propylene-based polymer, which is in a range of 75° C. to 110° C. The propylene-based polymer may be EBPT or BPRCP. The activity limiting agent may comprise at least one carboxylate ester functional group.

In another embodiment, the inventive process is a process of producing a propylene-based polymer in a fluidized-bed reactor, the reactor containing a fluidized bed comprising polymer product particles and a catalyst, the polymer having a seal initiation temperature (SIT) of 75° C. to 110° C., the process is conducted under copolymerization conditions comprising a reactor temperature that is 20° C. to 40° C. less than the SIT of the propylene-based polymer. The propylene-based polymer may be EBPT or BPRCP.

In another embodiment, the inventive process is a process of producing a propylene-based polymer in a fluidized-bed reactor, the reactor containing a fluidized bed comprising polymer product particles and a catalyst, the polymer having a seal initiation temperature (SIT) of 75° C. to 110° C., the process is conducted at copolymerization conditions comprising a reactor temperature and a propylene partial pressure in a range of 80% to 120% of the maximum partial pressure determined by the following equation:

$$PP_{C3\_max}=625-43.7E_t-20.0B_t-2.2T$$

wherein $E_t$, the ethylene content in the propylene-based polymer, is in a range of 0 to 2.5 wt %, preferably in a range of 0 to 1.5 wt %, $B_t$, the butene content in the propylene-based polymer, is in a range of 8 to 20 wt %, preferably in a range of 8 to 18 wt %, wherein $(2*E_t+B_t)$ is less than or equal to 21 wt %, and T is the reactor temperature with a unit of ° C., and the partial pressure is with a unit of psi (pound per square inch). The propylene-based polymer may be EBPT or BPRCP.

DETAILED DESCRIPTION

Figure 1:
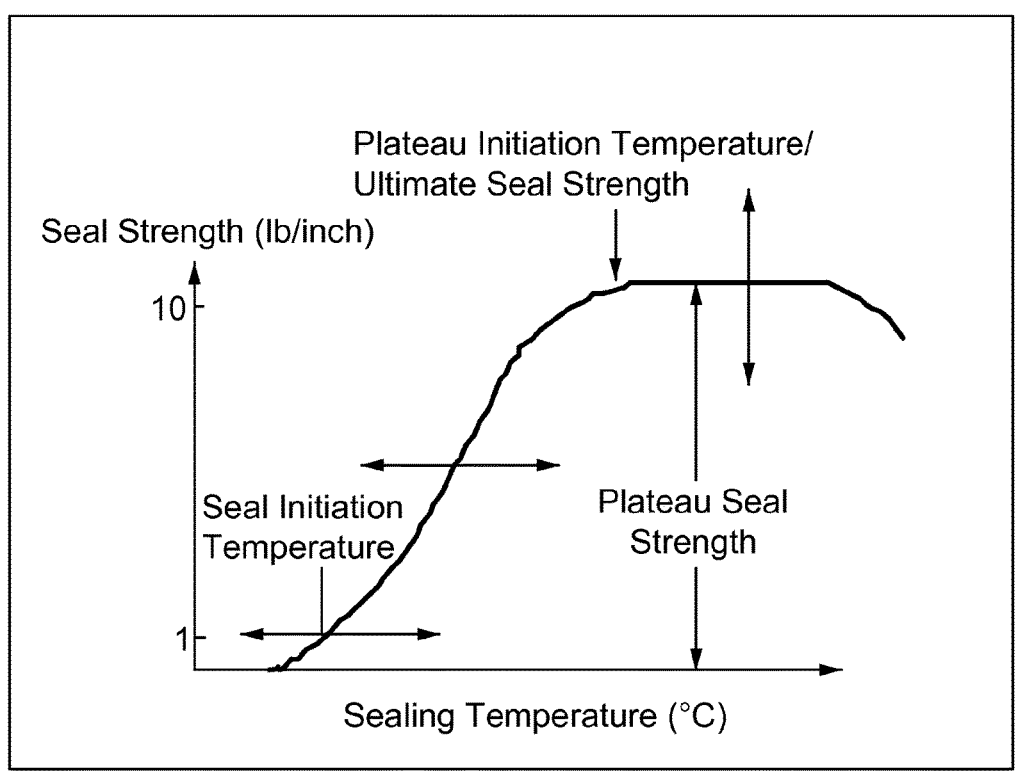
FIG. 1 is a graph of heat seal curve illustrating the determination of the seal initiation temperature (SIT).

The present invention is described with reference to embodiments of the invention.

Definitions

All references to the Periodic Table of the Elements refer to the Periodic Table of the Elements published at page 1-10 of the CRC Handbook of Chemistry and Physics, 71$^{St}$ Ed. (1990-1991). Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of the various components in the catalyst system, and the amounts of reactants in and the operating conditions of the inventive process.

"Composition" and like terms mean a mixture or blend of two or more components.

"Polymer" and like terms mean a macromolecular compound prepared by reacting (i.e., polymerizing) monomers of the same or different type. "Polymer" includes homopolymers and interpolymers.

"Interpolymer" and like terms means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Propylene-based polymer" and like terms mean a polymer in which at least 50%, preferably at least 60% and more preferably at least 65%, of the polymer units are derived from propylene.

"Fluidized-bed", "ebulating-bed", "bubbling-bed" and like terms mean a quantity of a solid particulate substance (typically present in a holding vessel, e.g., a reactor) expanded by the passage of fluid (such as gas) or fluids through it.

"High comonomer content" and like terms mean an EBPT comprising at least 0.8% units derived from ethylene and at least 8% units derived from butene, or a BPRCP comprising at least 8% units derived from butene. "Units derived from" and like terms mean a segment of a polymer that results from the copolymerization of a comonomer. In EBPT, the main monomer is propylene and the comonomers are ethylene and butene. In BPRCP, the main monomer is propylene and the comonomer is butene.

"Copolymerization conditions" and like terms mean the temperature, pressure, and other factors necessary for a main monomer and one or more comonomers to react with one another to form a copolymer. The structure and properties, e.g., molecular weight, melt index, etc., of the copolymer can and will vary with, among other things, the monomer and comonomer(s), the catalyst, the copolymerization conditions and the equipment used to make the copolymer.

"Seal initiation temperature", "SIT" and like terms mean the specific temperature corresponding to the initiation of the "seal" of the polymer film. SIT is the temperature where the seal strength is correspondent to 1 pound force/inch. Details of the SIT determination can be seen from the graph of the FIG. 1 and the data in the Table 1 below.

TABLE 1

Hot-Tack and Heat Seal Testing Laboratory Conditions

| Condition | Unit |
| --- | --- |
| Specimen Width | 1 inch |
| Sealing Pressure | 40 psi (0.27 N/mm$^2$) |
| Sealing Dwell Time | 0.5 seconds (s) |
| Delay Time (Hot Tack) | 0.2 or 0.1 second (as specified) |
| Delay Time (Heat Seal) | 24 hours conditioning at recommended ASTM F88 conditions |
| Peel Speed (Hot Tack) | 150 or 200 mm/s (as specified) |
| Peel Speed (Heat Seal) | 10 seconds |

"Maximum reactor temperature", "$T_{max}$" and like terms here mean the maximum bed temperature one can use in the fluidized-bed reactor, while not having polymer particle agglomeration concern. Usually, it can be measured by thermocouple or thermo resistor in the middle of the fluidized-bed in the reactor (but not limited to those methods).

"Crystallization temperature", "$T_c$", and like terms mean the peak temperature of the crystallization of a polypropylene-based polymer measured by DSC at 10° C./min. cooling rate.

"Minimum fluidization velocity", "Umf" and like terms mean the lowest superficial gas velocity at which the bed of polymer product particles through which the gas is flowing is fluidized, and it can be calculated by equations such as the Wen and Yu Equation (C. Y. Wen, Y. H. Yu, *AIChE Journal*, Vol. 12, p. 610 (1966)).

"Flow regime transition velocity" and like terms mean the superficial velocity of the gas passing through the fluidized bed necessary to change the flow regime from turbulent fluidization to fast fluidization. This transition velocity to the fast fluidization (i.e., the onset velocity of significant entrainment), Use, can be calculated by the correlation detailed in U.S. Pat. No. 8,324,327 by Cai, Painter and van Egmond.

EBPT and BPRCP

The ethylene-butene-propylene terpolymer is the interpolymer product of the copolymerization of the propylene monomer with ethylene and butene comonomers. The terpolymer typically comprises 0.2 to 5 percent (%) units derived from ethylene, 2 to 20% units derived from butene, and the remainder of the units derived from propylene.

The butene-propylene random copolymer is the interpolymer product of the copolymerization of the propylene monomer with butene comonomer. The copolymer typically comprises 2 to 20% units derived from butene and the remainder of the units derived from propylene. As here used, a random copolymer is a copolymer in which the comonomer, i.e., the units derived from butene, are distributed across the copolymer chain in a random manner as opposed to an alternating or block manner.

The monomer and comonomers are gases when contacted with one another under copolymerization conditions inside the gas-phase fluidized-bed reactor to form the EBPT or BPRCP. In addition to the monomer and comonomer(s), the gases in polymerization reactor can also contain one or more gases, inert to polymerization, e.g., nitrogen, ethane, propane, and butane, etc.

Catalyst System

The fluidized-bed polymerization reactor used in the practice of this invention may comprise a particulate catalyst/donor system that may comprise (1) a Ziegler-Natta pro-catalyst composition, (2) a co-catalyst, and (3) a mixed external electron donor (M-EED) comprising (a) an activity limiting agent (ALA), and (b) a selectivity control agent (SCA), each of which shall be discussed in detail below. The shape, average size and size distribution of these particles can vary widely, but typically have an average particle size of 1 to 100 microns (μm), more typically of 5 to 75 μm and even more typically of 10 to 50 μM. Typically the catalyst particles occupy only a very small amount of total fluidized-bed volume and weight. The vast majority of the remainder of the bed typically comprises polymer product particles which typically undergo continual growth until recovered from the reactor. The fluidized bed may also comprise inert particles, i.e., particles that are non-reactive with the monomers, comonomers, products and byproducts of the process under copolymerization conditions.

Any conventional Ziegler-Natta pro-catalyst as is commonly known in the art may be used in the present catalyst composition. In an embodiment, the Ziegler-Natta pro-catalyst composition contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof.

The transition metal compound has a general formula $TrX_x$ wherein Tr is the transition metal, X is a halogen or a $C_{1-10}$ hydrocarboxyl or hydrocarbyl group, and x is the number of such X groups in the compound in combination with a Group 2 metal compound. Tr may be a Group 4, 5 or 6 metal. In an embodiment, Tr is a Group 4 metal, such as titanium. X may be chloride, bromide, $C_{1-4}$ alkoxide or phenoxide, or a mixture thereof. In an embodiment, X is chloride.

Non-limiting examples of suitable transition metal compounds that may be used to form the Ziegler-Natta pro-catalyst composition include $TiCl_4$, $ZrCl_4$, $TiBr_4$, $TiCl_3$, Ti(OC$_2$H$_5$)$_3$Cl, Zr(OC$_2$H$_5$)$_3$Cl, Ti(OC$_2$H$_5$)$_3$Br, Ti(OC$_3$H$_7$)$_2$Cl$_2$, Ti(OC$_6$H$_5$)$_2$Cl$_2$, Zr(OC$_2$H$_5$)$_2$Cl$_2$, and Ti(OC$_2$H$_5$)Cl$_3$. Mixtures of such transition metal compounds may be used as well. No restriction on the number of transition metal compounds is made as long as at least one transition metal compound is present. In an embodiment, the transition metal compound is a titanium compound.

Non-limiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. In an embodiment, the Group 2 metal compound is magnesium dichloride.

In another embodiment, the Ziegler-Natta pro-catalyst composition is a mixture of titanium moieties supported on or otherwise derived from magnesium compounds. Suitable magnesium compounds include anhydrous magnesium chloride, magnesium chloride adducts, magnesium dialkoxides or aryloxides, or carboxylated magnesium dialkoxides or aryloxides. In an embodiment, the magnesium compound is a magnesium di(C$_{1-4}$)alkoxide, such as diethoxymagnesium.

Non-limiting examples of suitable titanium moieties include titanium alkoxides, titanium aryloxides, and/or titanium halides. Compounds used to prepare the Ziegler-Natta pro-catalyst composition include one or more magnesium-di(C$_{1-4}$)alkoxides, magnesium dihalides, magnesium alkoxyhalides, or mixtures thereof and one or more titanium tetra(C$_{1-4}$) alkoxides, titanium tetrahalides, titanium(C$_{1-4}$) alkoxyhalides, or mixtures thereof.

A precursor composition may be used to prepare the Ziegler-Natta pro-catalyst composition. The precursor composition may be prepared by the chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula Mg$_d$Ti(OR$_e$)$_f$X$_g$ wherein R$_e$ is an aliphatic or aromatic hydrocarbon radical having 1 to 14 carbon atoms or COR' wherein R' is an aliphatic or aromatic hydrocarbon radical having 1 to 14 carbon atoms; each OR$_3$ group is the same or different; X is independently chlorine, bromine or iodine; d is 0.5 to 56, or 2-4; or 3; f is 2-116, or 5-15; and g is 0.5-116, or 1-3, or 2. The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. The chlorinating agents lead to partial chlorination which results in a precursor containing relatively high level of alkoxy component(s). Removal of the alkanol from the solution used in the chlorination, results in precipitation of the solid precursor, having a desirable morphology and surface area. The precursor was separated from the reaction media. Moreover, the resulting precursor is particularly uniform particle size and resistant to particle crumbling as well as degradation of the resulting pro-catalyst. In an embodiment, the precursor composition is Mg$_3$Ti(OEt)$_8$Cl$_2$.

The precursor is next converted to a solid pro-catalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid pro-catalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization pro-catalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, or aliphatic or aromatic halohydrocarbon, especially at an elevated temperature greater than 100° C., or greater than 110° C., may be employed to remove labile species, especially TiCl$_4$.

In an embodiment, the Ziegler-Natta pro-catalyst composition includes a solid catalyst component obtained by (i) suspending a dialkoxy magnesium in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

In an embodiment, the Ziegler-Natta pro-catalyst composition includes a solid catalyst component obtained by (i) suspending a precursor material of the formula Mg$_d$Ti(OR$_e$)$_f$X$_g$ (as described previously) in an aromatic hydrocarbon or halohydrocarbon that is liquid at normal temperatures, (ii) contacting the precursor with a titanium halide and further (iii) contacting the resulting composition a second time with the titanium halide, and contacting the precursor with a diester of an aromatic dicarboxylic acid at some point during the treatment with the titanium halide in (ii).

The Ziegler-Natta pro-catalyst composition includes an internal electron donor. The internal electron donor provides tacticity control and catalyst crystallite sizing. Nonlimiting examples of suitable internal electron donors include aromatic dicarboxylic acid esters, halides or anhydrides or (poly)alkyl ether derivatives thereof, especially $C_{1-4}$ dialkyl esters of phthalic or terephthalic acid, phthaloyl dichloride, phthalic anhydride, and $C_{1-4}$ (poly)alkyl ether derivatives thereof. In an embodiment, the internal electron donor is diisobutyl phthalate or di-n-butyl phthalate.

The Ziegler-Natta pro-catalyst composition may also include an inert support material. The support may be an inert solid which does not adversely alter the catalytic performance of the transition metal compound. Examples include metal oxides, such as alumina, and metalloid oxides, such as silica.

The co-catalyst for use with the foregoing Ziegler-Natta pro-catalyst composition is an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the co-catalyst is a $C_{1-4}$ trialkylaluminum compound, such as triethylaluminum (TEA or TEAL). The molar ratio of aluminum to titanium may be from 35:1 to 150:1. In an embodiment, the molar ratio of aluminum to titanium to 45:1.

The catalyst composition includes a mixed external electron donor (M-EED) of two or more different components which include at least one activity limiting agent (ALA) and at least one selectivity control agent (SCA). As used herein, an "external electron donor" is a composition added independent of pro-catalyst formation that modifies the catalyst performance. As used herein, an "activity limiting agent" is a composition that decreases catalyst activity as the catalyst temperature rises above a threshold temperature (e.g., temperature greater than about 85° C.). A "selectivity control agent" is a composition that improves polymer tacticity. It should be understood that the above definitions are not mutually exclusive and that a single compound may be classified, for example, as both an activity limiting agent and a selectivity control agent.

The mixed external electron donor compound for use in the present invention preferably includes at least one carboxylate compound. The carboxylate compound can be either an ALA and/or a SCA component.

The selectivity control agent(s) (SCA) may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor includes an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ arylalkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the selectivity control agent component can be a mixture of two or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the mixed external electron donor may include a benzoate, a succinate, and/or a diol ester. In an embodiment, the mixed external electron donor includes 2,2,6,6-tetramethylpiperidine as an SCA. In another embodiment, the mixed external electron donor includes a diether as both an SCA and an ALA.

The mixed external electron donor system also includes an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl p-isopropoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis[4-(vinyloxy)butyl]terephthalate.

The aliphatic carboxylic acid ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (I):

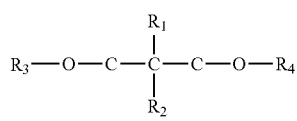

(I)

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may be linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (II):

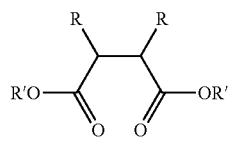

(II)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (III):

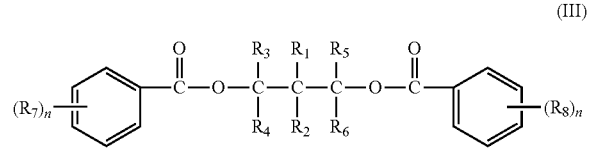

(III)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

The individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate, diisopropyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, diisopropyldimethoxysilane and n-propyltriethoxysilane and isopropyl myristate, and dicyclopentyldimethoxysilane and tetraethoxysilane and isopropyl myristate, dicyclopentyldimethoxysilane and diisopropyldimethoxysilane and n-propyltriethoxysilane and isopropyl myristate, and combinations thereof.

The M-EEP, whether added separately or pre-mixed, may be added at any point in the reactor, although the ALA should be present in the areas considered to be a greatest risk for agglomeration, such as the areas with highest solid holdup, highest fluidized-bed density and/or lowest gas velocity.

Process

In one embodiment of the present invention, the inventive process is a gas-phase process for producing a high comonomer content propylene-based polymer, the process comprising the step of contacting, under copolymerization conditions, (A) propylene, butene, and optionally ethylene, with one another within a fluidized-bed reactor, the reactor containing (B) a fluidized bed comprising a catalyst comprising (1) a supported Ziegler-Natta pro-catalyst, (2) a co-catalyst, and (3) a mixed external electron donor system comprising (a) an activity limiting agent and (b) a selectivity control agent, wherein the copolymerization conditions include a reactor temperature in a range, in units of ° C., of (0.57× SIT+4) to (0.87×SIT−9.25) where SIT is the seal initiation temperature of the propylene-based polymer, which is in a range of 75° C. to 110° C. The propylene-based polymer may be EBPT or BPRCP. The activity limiting agent may comprise at least one carboxylate ester functional group. The co-catalyst may be a trialkylaluminum. The mixing external donor system may comprise a selectivity control agent selected from the group consisting of dicyclopentyldimethoxysilane, n-propyltrimethoxysilane, and methylcyclohexyldimethoxysilane. The copolymerization conditions may include a pressure of 1 MPa to 5 MPa.

In another embodiment of the present invention, the inventive process is a process of producing a propylene-based polymer in a fluidized-bed reactor, the reactor containing a fluidized bed comprising polymer product particles and a catalyst, the polymer having a seal initiation temperature (SIT) of 75° C. to 110° C., the process is conducted under copolymerization conditions comprising a reactor temperature that is 20° C. to 40° C. less than the SIT of the propylene-based polymer. The propylene-based polymer may be EBPT or BPRCP.

The catalyst may comprise a catalyst/donor system comprising: a pro-catalyst composition (typically a supported Ziegler-Natta catalyst); an internal electron donor co-catalyst (e.g., triethyl aluminum (TEAL)); and a mixed external electron donor system (M-EED) comprising an activity limiting agent (ALA) and a selectivity control agent (SCA). The ALA may be a compound that contains at least one carboxylate ester functional group, e.g., an ester of aromatic or aliphatic acid, and it may also contain other functional group(s), including ether, ketone, carbonate, and/or other heteroatom(s) which include, but are not limited to, nitrogen (N), phosphorus (P), sulfur (S), and silicon (Si). The selectivity control agent (SCA) may be selected from the group consisting of dicyclopentyldimethoxysilane, n-propyltrimethoxysilane, and methylcyclohexyldimethoxysilane.

The fluidized bed may be fluidized with a pressurized gas having a gas velocity that is in a range of 5 times the minimum fluidization velocity to 1.6 times the flow regime transition velocity necessary to change the flow regime of the fluidized-bed from turbulent fluidization to fast fluidization.

The process may be conducted under a propylene partial pressure in a range of 80% to 120% of the maximum partial pressure, $PP_{C3\_max}$, as determined by the following equation:

$$PP_{C3\_max} = 625 - 43.7E_t - 20.0B_t - 2.2T$$

wherein $E_t$, the ethylene content in the propylene-based polymer, is in a range of 0 to 2.5 wt %, preferably in a range of 0 to 1.5 wt %, $B_t$, the butene content in the propylene-based polymer, is in a range of 8 to 20 wt %, preferably in a range of 8 to 18 wt %, and wherein $(2*E_t+B_t)$ is less than or equal to 21 wt %, and T is the reactor temperature with a unit of ° C., and the partial pressure is with a unit of psi.

In another embodiment of the present invention, the inventive process is a process of producing a propylene-based polymer in a fluidized-bed reactor, the reactor containing a fluidized bed comprising polymer product particles and a catalyst, the polymer having a seal initiation temperature (SIT) of 75° C. to 110° C., the process is conducted under copolymerization conditions comprising a reactor temperature and a propylene partial pressure in a range of 80% to 120% of the maximum partial pressure determined by the following equation:

$$PP_{C3\_max} = 625 - 43.7E_t - 20.0B_t - 2.2T$$

wherein $E_t$, the ethylene content in the propylene-based polymer, is in a range of 0 to 2.5 wt %, preferably in a range of 0 to 1.5 wt %, $B_t$, the butene content in the propylene-based polymer, is in a range of 8 to 20 wt %, preferably in a range of 8 to 18 wt %, and wherein $(2*E_t+B_t)$ is less than or equal to 21 wt %, and T is the reactor temperature with a unit of ° C., and the partial pressure is with a unit of psi (pound per square inch). The propylene-based polymer may be EBPT or BPRCP. The activity limiting agent may comprise at least one carboxylate ester functional group.

EBPT and BPRCP crystallization does not occur at a discrete temperature $T_c$. Instead, it is a gradual process. Thus, a proper difference between reactor temperature and $T_c$ is required to prevent resin particle stickiness. The same is true to the difference between reactor temperature and SIT. In this invention the maximum reactor temperature $(T_{max})$ of the process, is preferred to be 20° C. below the seal initiation temperature (SIT), or about 10° C. below the crystallization temperature $(T_c)$, in order to prevent particle agglomeration and the formation of polymer sheet.

In one embodiment of the present invention, the inventive process is a gas-phase process for making a propylene-based polymer in a fluidized-bed reactor, the reactor containing a fluidized-bed comprising polymer product particles and a catalyst in which the maximum reactor temperature $(T_{max})$ of the process (the "reactor temperature" means the average temperature of the fluidized bed in the reactor), is 20° C. below the seal initiation temperature (SIT) of the propylene-based polymer.

In another embodiment of the present invention, the inventive process is a gas-phase process for making a propylene-based polymer in a fluidized-bed reactor, the reactor containing a fluidized bed comprising polymer product particles and a catalyst in which the maximum reactor temperature $(T_{max})$ of the process, is 10° C. below the crystallization temperature (TO of the propylene-based polymer. The propylene-based polymer may be EBPT or BPRCP.

In another embodiment, the catalyst comprises a catalyst/donor system comprising: a pro-catalyst composition (typically a supported Ziegler-Natta catalyst); a co-catalyst (e.g., triethyl aluminum (TEAL)); and a mixed external electron donor system (M-EED) comprising an activity limiting agent (ALA) and a selectivity control agent (SCA). The ALA may be a compound that contains at least one carboxylate ester functional group, e.g., an ester of aromatic or aliphatic acid, and it may also contain other functional group(s), including ether, ketone, carbonate, and/or other heteroatom(s) which include, but are not limited to, nitrogen (N), phosphorus (P), sulfur (S), and silicon (Si). The selectivity control agent may be selected from the group consisting of dicyclopentyldimethoxysilane, n-propyltrimethoxysilane, and methylcyclohexyldimethoxysilane.

The gas velocity should not be so high as to cause significant carry-over and/or a low fluidized bulk density (and thus a low reactor inventory). On the other hand, the gas velocity should not be so low as to result in inadequate fluidization and mixing in the reactor. Gas density also affects the gas velocity selection. In general, a higher gas density corresponds to a lower value of the proper gas velocity.

Different fluidization regimes exist and are well known in the art of fluid-bed processes (see, for example, U.S. Pat. No. 8,178,633). When the fluidized bed during polymerization transforms from one fluidization regime to another fluidization regime, a significant change of reactor operation status is observed. For example, if a pressurized fluidized-bed reactor changes from a turbulent fluidization regime to a fast fluidization regime, a very significant increase of particle carryover out of the reactor occurs, and it is difficult to maintain a normal and relatively dense bed operation. As such, a turbulent or bubbling fluidization regime is desired although the lower end of a fast fluidization regime is also functional.

In one embodiment of the present invention, the inventive process is a gas-phase process for making a propylene-based polymer in a fluidized-bed reactor, the reactor containing a fluidized bed comprising polymer product particles and catalyst in which the gas velocity of the process is between 5 times the minimum fluidization velocity (Umf) and 1.6 times the flow regime transition velocity from turbulent fluidization to fast fluidization (that transition velocity is also called the onset velocity of significant entrainment, or Use). Preferably, the gas velocity is below 1.3 times of Use. Detailed introduction and description of the turbulent fluidization regime and fast fluidization regime can be seen in (but not limited to) the book of "Principles of Gas-Solid Flows," by Fan and Zhu, Cambridge University Press, 1998. The propylene-based polymer may be EBPT or BPRCP.

EXAMPLES

All the examples involve catalyst systems composed by (1) supported Ziegler-Natta pro-catalyst, (2) co-catalyst, and (3) external electron donor. The following catalysts, co-catalyst, and external electron donors were employed in the examples,

- Pro-Catalyst A is a Ziegler-Natta catalyst detailed in Examples 14-16 of U.S. Pat. No. 5,604,172.
- Pro-Catalyst B is a Ziegler-Natta catalyst detailed in Example 4 of U.S. Pat. No. 8,778,826.
- Co-catalyst is TEAL (Triethylaluminum).
- External Donor A is NPTMS (n-propyltrimethoxysilane), a commonly used external donor in the polypropylene industry.
- External Donor B is a mixed external electron donor (M-EED) system of 95% DBS (di-n-butyl sebacate) as the "activity limiting agent"+5% methylcyclohexyldimethoxysilane (also called cyclohexyldimethoxymethylsilane) as the "selectivity control agent".

Propylene-Butene-Ethylene terpolymer products with high butene content (Bt) were produced in those examples. All the polymerization reactions of the examples were conducted in a fluidized-bed UNIPOL™ polypropylene reactor. The reactor system is similar to that described and illustrated in U.S. Pat. No. 4,588,790, with the following detailed specification and operating conditions:

Internal diameter of the reactor=1.17 ft (0.357 m).

Bed weight=90 lb (40.9 kg).

Superficial gas velocity=1.2–1.5 ft/s (0.366–0.456 m/s).

Detailed operating conditions and products information of all the examples are listed in Table 2 below, and SIT was determined by the method illustrated earlier.

TABLE 2

| Example | Pro-Catalyst | External Donor | Butent Content (Bt) (wt %) | Ethylene Content (Et) (wt %) | Reactor Temperature (T) | Propylene Partial Pressure $^{c*}$ | SIT | $T_{max}$ $^{a*}$ | T > $T_{max}$? | Catalyst Productivity | Operation | Comments |
|---|---|---|---|---|---|---|---|---|---|---|---|---|
| Comparative 1a | A | A | 14.1 | 1.3 | 65° C. $^{b*}$ | 70 psi (0.483 MPa) | 90° C. | 69° C. | No | 3.4 kg/g | OK | Productivity too low for commercial interest |
| Comparative 1b | A | A | 13.5 | 2.5 | 65° C. $^{b*}$ | 70 psi (0.483 MPa) | 85° C. | 65° C. | No | 4.8 kg/g | Marginal | |
| 1 | A | B | 14 | 1.5 | 70° C. | 130 psi (0.986 MPa) | 92° C. | 71° C. | No | 39 kg/g | Very Good | High Productivity |
| Comparative 2 | B | B | 14.7 | 1.2 | 80° C. | 110 psi (0.758 MPa) | 91° C. | 70° C. | Yes | — | Bad, formed agglomerates | Reactor had to be shut down for cleaning |
| 2 | B | B | 14.7 | 1.2 | 70° C. | 110 psi (0.758 MPa) | 91° C. | 70° C. | No | 48 kg/g | Very Good | High Productivity |
| Comparative 3 | B | B | 18.5 | 1.5 | 65° C. | 80 psi (0.552 MPa) $^c$ | 80° C. | 60° C. | Yes | — | Bad, formed agglomerates | Reactor had to be shut down for cleaning |
| 3a | B | B | 19.0 | 0.6 | 55° C. | 90 psi (0.621 MPa) | 88° C. | 67° C. | No | 52 kg/g | Very Good | High Productivity |
| 3b | B | B | 18.5 | 1.5 | 55° C. | 80 psi (0.552 MPa) | 80° C. | 60° C. | No | 45 kg/g | Very Good | High Productivity |

$^{a*}$ $T_{max}$ was determined by $T_{max} = 0.87 \times SIT - 9.25$.
$^{b*}$ further increase of temperature or propylene partial pressure got the polymer bed sticky.
$^{c*}$ the propylene partial pressure of every example is within the limit defined by the equation, i.e., 80%-120% of $PP_{C3\_max} = 625 - 43.7E_t - 20.0B_t - 2.2T$, except Comparative Example 3 which has the propylene pressure higher than the limit of the above equation.

It can be seen from the table that the operation of Comparative Examples 1a and 1b, using a single external electron donor instead of the special mixed external donor defined by this invention, generated very low catalyst productivities which are below the threshold of commercial interest. Further increase of reactor temperature and/or propylene partial pressure would cause the polymer bed to be sticky and the operation would not be sustainable.

Example 1 basically repeating Comparative Examples 1a and 1b but with the special mixed donor, allows the reactor to be operated at a higher pressure and a higher propylene partial pressure, and resulted in an excellent reactor operability with high catalyst productivity.

Comparative Example 2 running at a reactor temperature 10° C. higher than the upper limit of the operating temperature range defined by this invention, caused the agglomeration of polymer particles in the reactor. Thus, the operation could not be continued, and the reactor had to be shut down for cleaning.

Example 2 basically repeating Comparative Example 2 except with the reactor temperature below the upper limit of the operating temperature range defined by this invention, and resulted in excellent reactor operability with high catalyst productivity.

Comparative Example 3 running at a reactor temperature 5° C. higher than the upper limit of the operating temperature range defined by this invention, for the production of very high Bt terpolymer product, caused the agglomeration of polymer particles in the reactor. Thus, the operation could not be continued, and the reactor had to be shut down for cleaning. In addition, the propylene partial pressure of this example was higher than the upper limit defined by 120% of the value calculated by the following equation:

$$PP_{C3\_max}=625-43.7E_t-20.0B_t-2.2T$$

where $E_t$, the ethylene content in the propylene-based polymer, is in a range of 0 to 2.5 wt %, $B_t$, the butene content in the propylene-based polymer, is in a range of 8 to 20 wt %, and where $(2*E_t+B_t)$ is less than or equal to 21 wt %, and T is the reactor temperature with a unit of ° C., and the partial pressure is with a unit of psi.

Examples 3a and 3b basically repeating Comparative Example 3 except with the reactor temperature below the upper limit of the operating temperature range defined by this invention, and resulted in excellent reactor operability with high catalyst productivities.

What is claimed is:

1. A process of producing a propylene-based polymer, the process comprising contacting, under copolymerization conditions, (A) propylene, butene and optionally ethylene, in a fluidized-bed reactor, the reactor containing (B) a fluidized bed comprising propylene-based polymer product particles and a catalyst, the propylene-based polymer having a seal initiation temperature (SIT) of 75° C. to 110° C., the process conducted under copolymerization conditions comprising a reactor temperature that is 20° C. to 40° C. less than the SIT of the propylene-based polymer; and wherein the catalyst comprises (1) a Ziegler-Natta pro-catalyst composition, (2) a co-catalyst, and (3) a mixed external electron donor (M-EED) system comprising (a) an activity limiting agent, and (b) a selectivity control agent, the process having a propylene partial pressure in a range of 80% to 120% of the maximum partial pressure, $PP_{C3\_max}$, as determined by the following equation:

$$PP_{C3\_max}=625-43.7E_t-20.0B_t-2.2T$$

where $E_t$, the ethylene content in the propylene-based polymer, is in a range of 0 to 2.5 wt %, $B_t$, the butene content in the propylene-based polymer, is in a range of 8 to 20 wt %, and where $(2*E_t+B_t)$ is less than or equal to 21 wt %, and T is the reactor temperature with a unit of ° C., and the partial pressure is with a unit of psi.

2. The process of claim 1 in which the activity limiting agent comprises at least one carboxylate ester functional group.

3. The process of claim 1 in which the selectivity control agent is selected from the group consisting of dicyclopentyldimethoxysilane, n-propyltrimethoxysilane, and methylcyclohexyldimethoxysilane.

4. The process of claim 1 in which the fluidized-bed reactor is fluidized with a pressurized gas having a gas velocity that is in a range of 5 times the minimum fluidization velocity to 1.6 times the flow regime transition velocity necessary to change the flow regime of the fluidized bed from turbulent fluidization to fast fluidization.

5. The process of claim 1 in which $E_t$ is in a range of 0 to 1.5 wt % and $B_t$ is in a range of 8 to 18 wt %.

6. The process of claim 1 in which the propylene-based polymer is one of EBPT and BPRCP.

7. A process of producing a propylene-based polymer in a fluidized-bed reactor comprising propylene-based polymer product particles and a catalyst, the propylene-based polymer having a seal initiation temperature (SIT) of 75° C. to 110° C., the process conducted under copolymerization conditions comprising a reactor temperature and a propylene partial pressure in a range of 80% to 120% of the maximum partial pressure, $PP_{C3\_max}$, as determined by the following equation:

$$PP_{C3\_max}=625-43.7E_t-20.0B_t-2.2T$$

where $E_t$, the ethylene content in the propylene-based polymer, is in a range of 0 to 2.5 wt %, $B_t$, the butene content in the propylene-based polymer, is in a range of 8 to 20 wt %, and where $(2*E_t+B_t)$ is less than or equal to 21 wt %, and T is the reactor temperature with a unit of ° C., the partial pressure is with a unit of psi, and wherein the catalyst comprises (1) a Ziegler-Natta pro-catalyst composition, (2) a co-catalyst, and (3) a mixed external electron donor (M-EED) system comprising (a) an activity limiting agent, and (b) a selectivity control agent.

8. The method of claim 7 in which the process is conducted at a maximum reactor temperature that is 20° C. less than the SIT of the propylene-based polymer.

9. The method of claim 7 in which the process is conducted at a maximum reactor temperature that is 10° C. less than the crystallization temperature ($T_c$) of the propylene-based polymer.

10. The process of claim 7 in which the fluidized-bed reactor is fluidized with a pressurized gas having a gas velocity that is in a range of 5 times the minimum fluidization velocity to 1.6 times the flow regime transition velocity necessary to change the flow regime of the fluidized bed from turbulent fluidization to fast fluidization.

11. The process of claim 7 in which the propylene-based polymer is one of EBPT and BPRCP.

12. The process of claim 7 in which the activity limiting agent comprises at least one carboxylate ester functional group.

13. The process of claim 7 in which the selectivity control agent is selected from the group consisting of dicyclopentyldimethoxysilane, n-propyltrimethoxysilane, and methylcyclohexyldimethoxysilane.

\* \* \* \* \*